I. Z. ISRAEL.
MACHINE FOR BAKING WAFERS AND THE LIKE.
APPLICATION FILED APR. 19, 1911.

1,016,749.

Patented Feb. 6, 1912.

5 SHEETS—SHEET 1.

Witnesses:

Inventor
Israel Z. Israel
By his Attorney

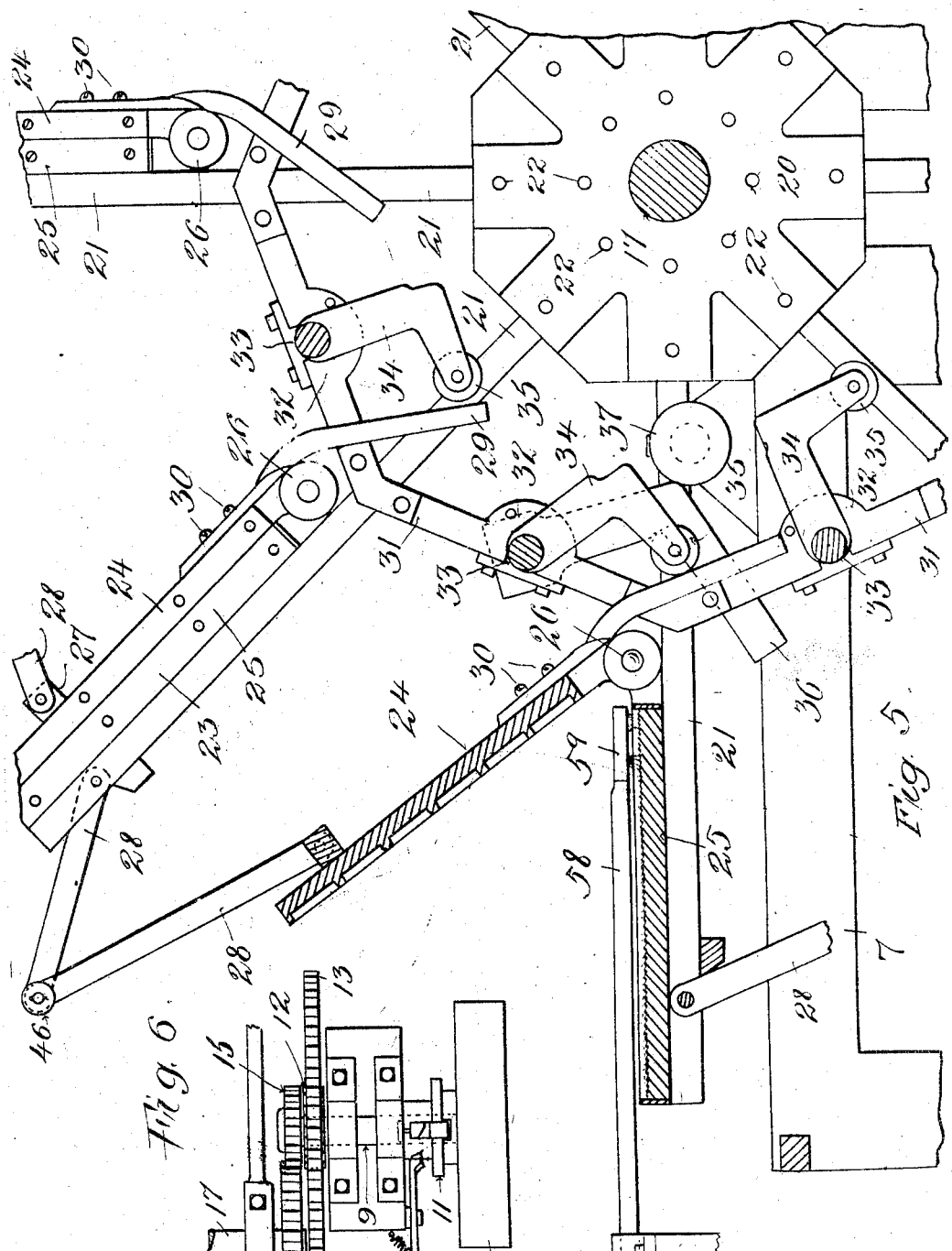

UNITED STATES PATENT OFFICE.

ISRAEL Z. ISRAEL, OF NEW YORK, N. Y., ASSIGNOR TO SIDNEY M. ISRAEL, OF NEW YORK, N. Y.

MACHINE FOR BAKING WAFERS AND THE LIKE.

1,016,749.      Specification of Letters Patent.      Patented Feb. 6, 1912.

Application filed April 19, 1911. Serial No. 621,975.

*To all whom it may concern:*

Be it known that I, ISRAEL Z. ISRAEL, a subject of the Czar of Russia, and a resident of the city, county, and State of New York, whose post-office address is 177 Grand street, in said city, have invented a new and useful Improvement in Machines for Baking Wafers and the Like, of which the following is a specification.

The object of my invention is to provide a machine of this class which will be simple, durable and efficient to bake a large number of wafers with a minimum of materials and labor. This object is accomplished by my invention as will appear below.

Figure 1:
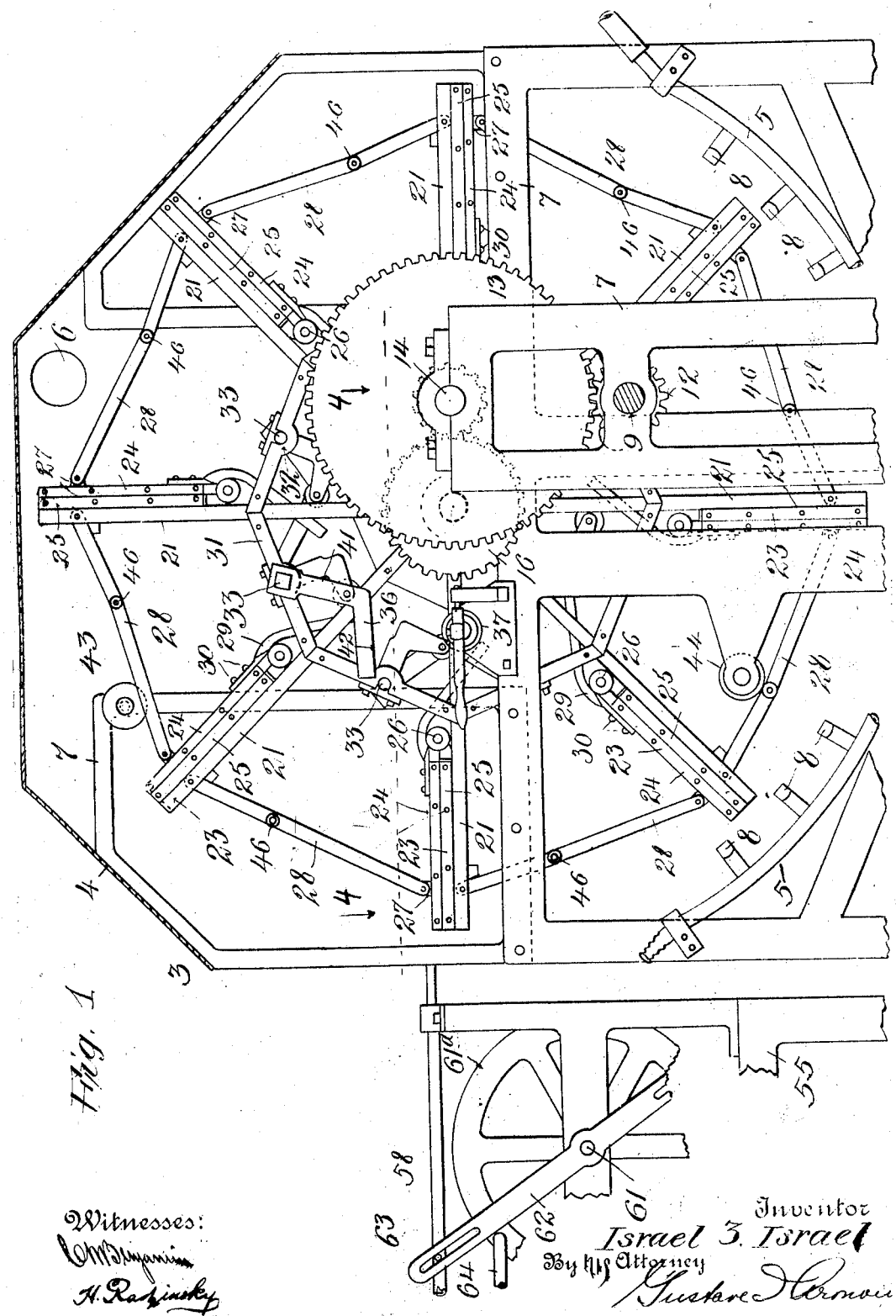
Figure 2:
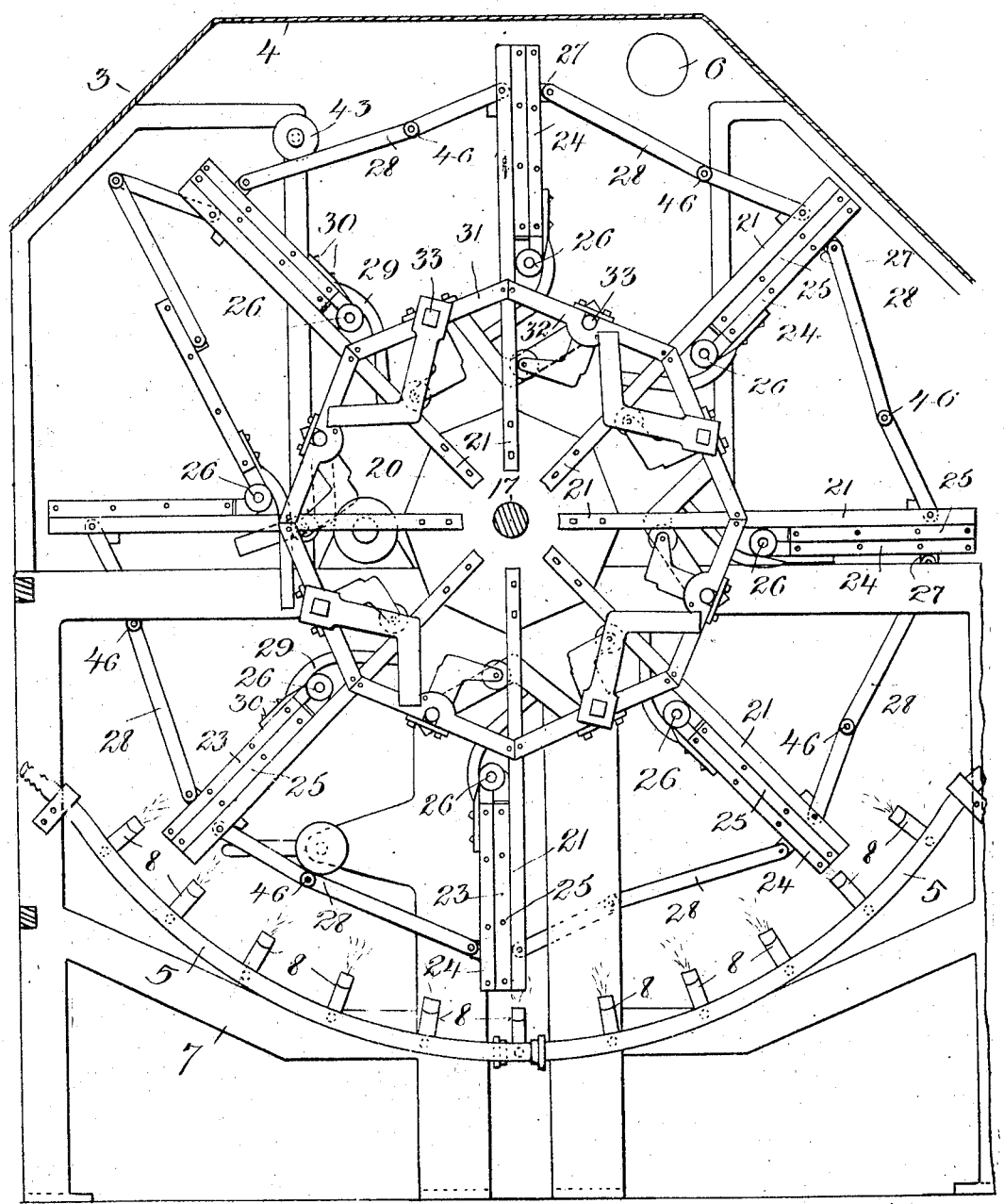
Figure 3:
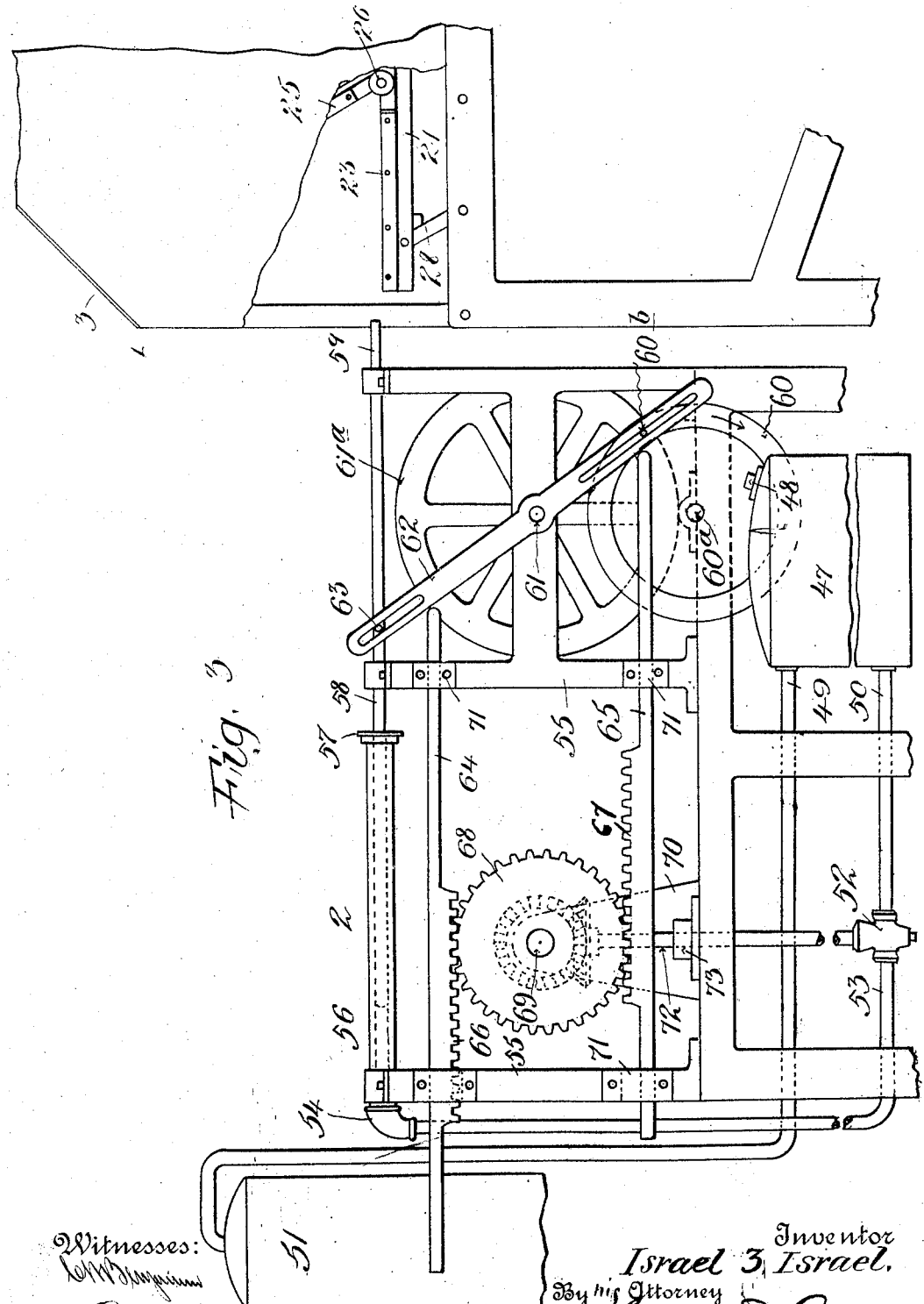
Figure 4:
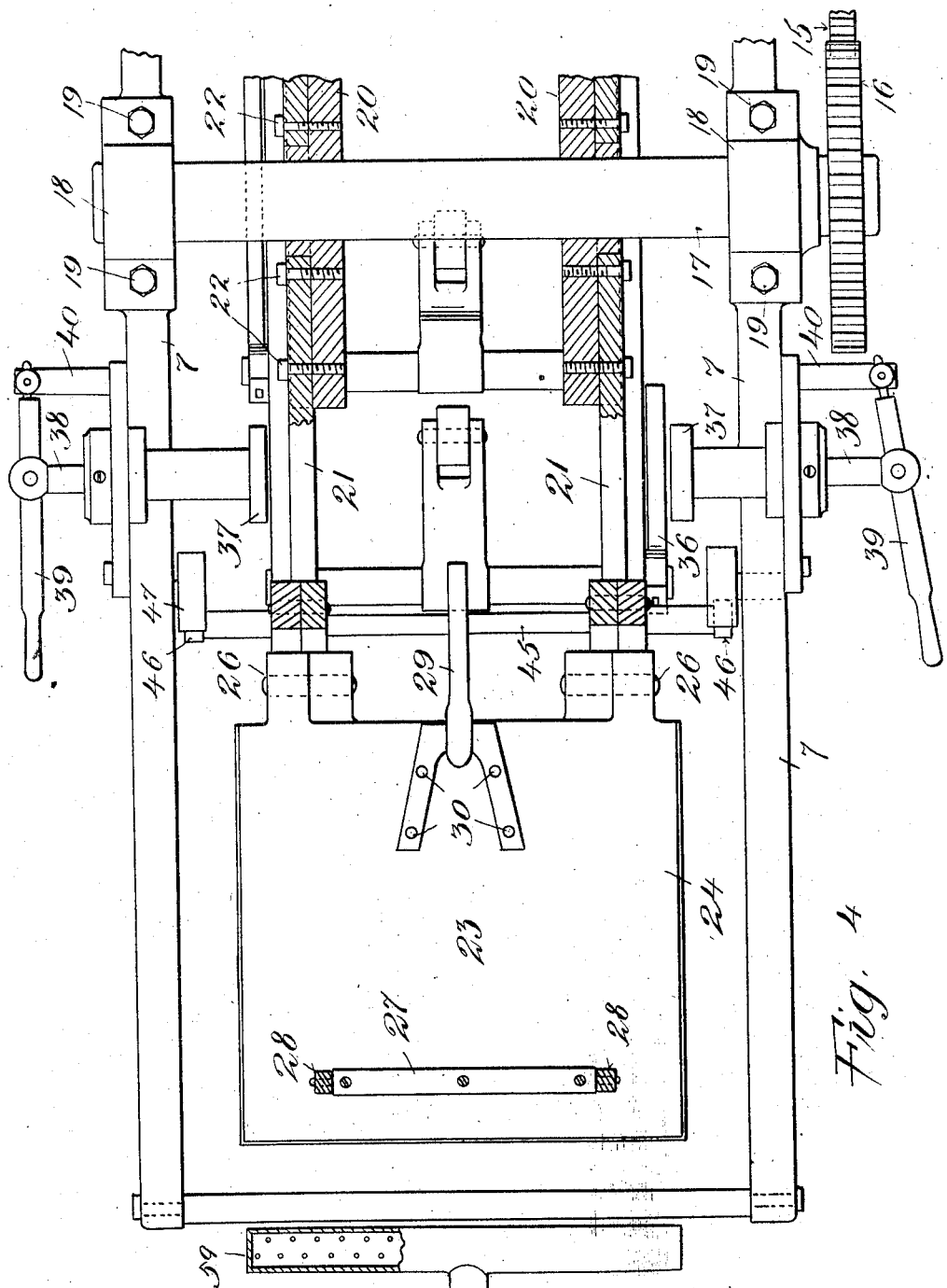

Figure 1 is a side elevation, partially in section, of my improved machine. Fig. 2 is a similar section, parts omitted, with the apparatus in a different condition. Fig. 3 is an end elevation showing the mechanism for supplying batter. Fig. 4 is a sectional view taken on the line 4—4 of Fig. 1, looking in the direction of the arrows. Fig. 5 is a sectional view of the structure shown in Fig. 4, the mechanism being in a different position. Fig. 6 is a detailed view showing the driving and clutch mechanism.

Throughout the various views of the drawings, similar reference characters designate similar parts.

My improved machine 1 consists of a batter supplying mechanism 2 and an oven 3 together with the parts therein contained. The oven 3 consists of a casing 4 which is heated in its lower part by a suitable gas-pipe 5, or other suitable means, and a ventilated in its upper portion through a suitable flue 6 which may be placed in any suitable location, just as a stove-pipe is placed on a stove. The casing 4 also has a frame 7 which supports the gas-pipe 5 with its burners 8 as well as the mechanism of the oven. The main driving shaft 9 is driven by a suitable fly-wheel 10 and is connected to this shaft 9 by clutch mechanism 11 and carries a pinion 12 that meshes with a large gear-wheel 13 on a shaft 14 which also carries a pinion 15 that meshes with a gear 16 fixed to a shaft 17 journaled in the frame 7. The gears are so arranged and disposed that the angular velocity of the shaft 9 is to the shaft 17 in the ratio of 8 to 1 so that the fly-wheel 10 makes eight revolutions for every revolution of the shaft 17.

The clutch mechanism is so arranged and disposed that when the treadle 18 is not pressed the fly-wheel 10 stops at the end of every revolution. The details of the clutch form no part of my invention.

The shaft 17 is journaled in suitable blocks 18 which are held on the frame 7 by means of suitable bolts 19, or in any other desired manner, and between these blocks are fixed a pair of hubs 20 from which radiate suitable spokes 21 which are fixed in place by means of cap screws 22 or in any suitable manner. In the embodiment of my invention hereinafter disclosed eight of these spokes 21 are shown on each hub making sixteen spokes or eight pairs. A greater or smaller number of pairs may be employed if so desired, as the number is not material. Each pair of spokes 21 carries a waffle-iron 23 which consists of two parts, an upper, 24 and a lower, 25, hinged together at 26, the part 25 being fixed to the spokes 21 to which the iron is secured and the part 24 is provided with a bar 27 which is connected to toggle levers 28 which connect each waffle-iron 23 with adjacent irons, the part 24 of one being connected to the part 25 of the next and near the free ends of said irons, that is the ends remote from the shaft 17. These toggle levers 28 are made in pairs so that the parts 24 and 25 of the waffle-irons 23 will be firmly compressed when in use. Each part 24 is provided with a projection 29 secured by screws 30 or other suitable means. This projection 29 is one of the elements for causing the iron to be opened and closed in a manner which will be described below.

The spokes 21 are also connected by means of suitable bars 31 about midway of their length, and these bars 31, at or near their centers, carry bars 32 for shafts 33 which carry bent arms 34 with rollers 35 at their free ends, to engage the projections 29 and cause the irons 23 to open or close. These shafts 33 are made square at one end and are so arranged that the square end of one is at the same end as the rounded ends of adjacent shafts 33 so that if the even numbered shafts 33 have square ends at the right of the machine the odd numbered shafts have their squared ends at the left. This structure is so made because the square ends of the shafts 33 carry in each instance a cam 36 which is adapted to engage a roller 37 on a shaft 38 mounted in the frame 7 of the machine. The shaft 38 can be moved in the direction of each length by means of a lever 39 pivoted thereto and fulcrumed in a projection 40 which extends from the frame 7. One of these levers 39 is on each side of the machine, as well as the connected parts, such as the shaft 38 and roller 37. This structure permits either or both of the rollers 37 to be put in position to engage the cams 36.

For convenience the cams 36 are considered as having two cam surfaces, although, it is obvious they have but one active surface as the parts merge into each other by imperceptible gradations. One part is the part 41 and the other part is the part 42, and these two parts meet at the pointed exterior. While the roller 37 engages the part 41 the free end of the cam 36 is thrown away from the shafts 17 and thereby causes its rollers 35 to press against the projection 29 and open the waffle iron by raising the part 24 from the part 25. As the rotation of the shaft 17 continues the cam 36 gets beyond the roller 37 and then its surface 42 comes in contact with this roller and the weight of the parts is sufficient to keep it against the same, and then the cover 24 of the waffle-iron 23 is replaced on the part 25 and the toggle 28 is correspondingly straightened. As the movement continues further a roller 43 mounted on a stud fixed in the frame 7 comes in contact with a roller 45 on a bar 46 on the toggle and presses the toggle a little beyond the dead center, so that the parts of the waffle-iron are compressed and so held. A corresponding roller 44 at the lower portion of the frame 7 performs the opposite function of opening the toggles sufficiently to make them shift so that they are on the opened side of the dead center. Without this opening it would be impossible for the cam 36 to act, as above described, and the apparatus would be injured or broken.

The batter supply mechanism 2 is placed at one end or one side of the oven 3 and consists of a batter tank 47 which receives batter through a suitable opening which is closed by a plug 48 and this tank 47 is provided with an air-pipe 49 and a batter-pipe 50. The air-pipe 49 is connected with an air tank 51 which is supplied by compressed air at a suitable pressure, which comes from any convenient source. The batter pipe 50 runs to a valve 52 which opens and closes in a manner described below and from there a pipe 53 runs to an elbow 54 supported in a suitable frame 55 and this elbow connects with a larger pipe 56 which has a stuffing box 57 through which extends a smaller pipe 58 which is adapted to move in the direction of its length and is provided at its outer end with a suitable distributer or rose 59 which is placed on one side of the machine as shown in Fig. 4 and out of the way of the operator or it may be located in any other convenient way. The distributing apparatus is run by a wheel 60 mounted on a suitable shaft 60ª which is journaled in the frame 55, and this shaft 60ª is parallel to a shaft 61 which is provided with a bar 62 which is fixed on said shaft and provided with a slot at each end, one of which receives a pin 63 on the pipe 58 and the other a pin 60ᵇ on the wheel 60, so that by rotating this wheel the pipe 58 is correspondingly shifted for a limited distance. The bar 62 also comes in contact with two rods 64 and 65 which are provided with racks 66 and 67 respectively, these racks meshing with a suitable gear 68 mounted on a shaft 69. The shaft 69 is supported by a suitable bearing 70 on the frame 55 of the machine and the rods 64 and 65 slide in suitable bearings 71 which are also placed on the frame 55 of the machine. The shaft 69 also carries a suitable beveled gear that meshes with a corresponding gear on a shaft 72 which is vertically disposed and runs through a suitable bearing 73 to the valve 52. This structure results in shutting the valve on or off at appropriate times from the wheel 60. A hand wheel 61ª is also shown on the shaft 61. This may be omitted if desired.

In view of the foregoing the operation of my improved machine for baking wafers and the like will be readily understood. When the machine is in the condition indicated in Fig. 1, the burners 8 are all lighted in the conventional manner and the shaft 17 is put in motion and kept in motion until all the irons 23 are properly heated. When heated, the rollers 37 are thrown into mesh with their respective cams 36 and then the irons 23 are opened as described above, and when opened the clutch mechanism stops the machine as indicated above. If necessary, a brake may be applied to the shaft 9 or some other shaft so as to cause the machine to stop quickly. As soon as a waffle-iron 23 opens, the operator turns the wheel 60 in the direction of the arrow in Fig. 3, and, assuming that the apparatus is properly charged with batter, the pipe 58 is run in the direction of its length toward the open iron 23, and then the valve 52 is opened through the mechanism described above, and batter is squirted out over the lower iron 25 and distributed over the same through the rose 59 and then the direction of movement of the bar 62 is reversed, the rose 59 is withdrawn and the batter shut off and the operator places his foot on the lever 18 and starts the machine. As soon as the machine is started the iron 23 is closed and the next one is brought up and opened in the manner above described and the toggles made secure on the rollers 43 and opened on the rollers 44 as above set forth. The process above described is repeated until every iron is filled with batter and then if necesary, the shaft 17 is turned so that the irons pass several times before the burners 8. Ordinarily, it is not necessary to pass them more than once so that every time the iron gets near the loading mechanism it is opened, the wafers are removed, the batter is supplied, the iron is closed and this process is repeated indefinitely as long as the machine is in operation.

While I have shown and described one embodiment of my invention, it is obvious that it is not restricted thereto but is broad enough to cover all structures that come within the scope of the annexed claims.

What I claim is:—

1. A batter supplying device for waffle-irons consisting of a frame, a source of compressed air, a batter tank connected to said source whereby air under pressure is placed on top of the batter in said batter container, a pipe running from said batter container, a valve in said pipe, a second pipe connected to said valve which is also connected to an enlarged pipe and a smaller pipe telescoped in said larger pipe and provided at its free end with a suitable rose and means for moving said last-mentioned pipe in the direction of its length, and means for opening said valve when said pipe is at or near the limits of its movement, and closing said valve as soon as said pipe leaves the limit of its movement.

2. A batter supplying device composed of a frame, a source of air supply, a batter tank connected thereto, a batter pipe connected to said tank, and provided with a valve, means mounted in said frame for connecting said valve with a gear wheel, a pair of racks, engaging said gear and mounted in said frame, an oscillating arm adapted to engage said racks, and a movable pipe connected with said arm and also with said valve whereby said arm may be thrust in the direction of its length and supplied with batter and when withdrawn the batter supply is cut off.

3. A machine for baking wafers composed of an oven provided with heaters, a frame, a shaft mounted to rotate in said frame and means for driving said shaft, hubs on said shaft, spokes extending from said hubs, waffle irons mounted on said spokes, toggles adapted to force said irons into a closed position, means for opening and means for closing said toggles and means for opening said waffle irons.

4. In an apparatus for baking wafers, an oven provided with means for heating the same, a frame, a shaft mounted to rotate in said frame, hubs on said shaft, spokes radiating from said hubs, waffle-irons connecting said spokes so that one spoke on one hub is connected with the corresponding spoke on the other hub, each of said waffle-irons being composed of two parts, hinged together, toggle levers connecting said waffle irons, means for bringing said toggles beyond their dead centers whereby the irons are kept in a compressed state, and means for forcing said toggles in opposite directions so that the irons may be opened, bars connecting said spokes, shafts mounted in said bars, connections between said bars and waffle irons, cams on said bars and rollers on said frame adapted to engage said cams, whereby said irons may be opened.

5. In an apparatus for baking wafers, an oven, means for heating the same, a frame, a shaft mounted in said frame and means for driving said shaft, hubs on said shaft, spokes radiating from said hubs, waffle-irons secured to said spokes each iron being composed of two parts hinged together, one of said parts being fixed to said spokes, projecting arms from the movable irons, and each waffle iron a roller adapted to engage said projection, a shaft and means for supporting said roller from said shaft, and means for oscillating said shaft, whereby said iron may be opened at a predetermined time.

6. In an apparatus for baking waffles, an oven and means for heating the same, a frame and a shaft mounted therein, hubs on said shaft, spokes radiating from said hubs, waffle irons connecting said spokes, each waffle iron being provided with a projection secured to one of its members, a roller adapted to engage said projection, an arm supporting said roller, a shaft supporting said arm, a cam on said shaft with two parts disposed at an angle, one to the other, and a roller mounted on said frame and adapted to be engaged by said cam, whereby a waffle iron is opened and closed at a predetermined time.

ISRAEL Z. ISRAEL.

Witnesses:
J. W. MARTIN,
MAX ISRAEL.